United States Patent
Stinebruner

[11] Patent Number: 6,133,910
[45] Date of Patent: Oct. 17, 2000

[54] APPARATUS AND METHOD FOR INTEGRATING A PLURALITY OF VIDEO SOURCES

[75] Inventor: Scott A. Stinebruner, Florence, Ky.

[73] Assignee: EchoStar Engineering Corp., Littleton, Colo.

[21] Appl. No.: 08/933,052

[22] Filed: Sep. 18, 1997

Related U.S. Application Data

[60] Provisional application No. 60/026,409, Sep. 20, 1996.

[51] Int. Cl.$^7$ ............................................... H04N 7/10
[52] U.S. Cl. ........................... 345/327; 348/731; 348/906
[58] Field of Search ................................ 345/327, 328; 348/10, 12, 721–734, 906; 455/3.2; H04N 7/10, 5/445

[56] References Cited

U.S. PATENT DOCUMENTS

| | | |
|---|---|---|
| 4,337,480 | 6/1982 | Bourassin et al. . |
| 4,675,732 | 6/1987 | Oleson . |
| 4,706,121 | 11/1987 | Young . |
| 4,743,968 | 5/1988 | Mogi et al. . |
| 4,817,203 | 3/1989 | Tsurumoto et al. . |
| 4,841,368 | 6/1989 | Rumbolt et al. . |
| 4,885,803 | 12/1989 | Hermann et al. . |
| 4,914,517 | 4/1990 | Duffield . |
| 5,045,947 | 9/1991 | Beery . |
| 5,204,768 | 4/1993 | Tsakiris et al. . |
| 5,276,904 | 1/1994 | Mutzig et al. . |
| 5,303,403 | 4/1994 | Leong . |
| 5,457,478 | 10/1995 | Frank . |
| 5,461,427 | 10/1995 | Duffield et al. . |
| 5,473,317 | 12/1995 | Inomata et al. . |
| 5,488,357 | 1/1996 | Sato et al. . |
| 5,828,945 | 10/1998 | Klosterman ........................... 348/12 X |
| 5,883,677 | 3/1999 | Hofmann ............................. 348/906 X |
| 5,982,411 | 11/1999 | Eyer et al. ........................... 348/906 X |

FOREIGN PATENT DOCUMENTS 0 375 467  12/1988  European Pat. Off. .

*Primary Examiner*—Nathan Flynn
*Attorney, Agent, or Firm*—Kerry Philip Miller

[57] ABSTRACT

A video system utilizes a "virtual tuner" that integrates signals from multiple video sources to provide a plurality of "virtual channels", each of which has both a video source and a channel associated with it. When a virtual channel is selected, the correct video source is selected and tuned to the correct channel automatically. The virtual tuner may be embodied in a television or in a separate electronic component coupled thereto, such as a direct broadcast satellite receiver. Alternatively, the video system may be embodied in a universal remote control which is capable of outputting multiple signals to multiple devices in response to a key depression, using either one or two signal transmitters. Channel information may also be downloaded or obtained from a database, for example, to customize an electronic component to receive local broadcast channels.

9 Claims, 9 Drawing Sheets

| VIRTUAL CHANNEL | VIDEO SOURCE | SOURCE CHANNEL | CHANNEL ID |
|---|---|---|---|
| 1 | 3 (DIRECT) | 0 | CAMCORDER |
| 2 | 2 (DBS) | 2 | ESPN |
| 3 | 2 (DBS) | 3 | COURT TV |
| 4 | 0 (TV) | 4 | WCCO |
| 5 | 0 (TV) | 5 | KSTP |
| 6 | 2 (DBS) | 6 | CNN |
| 7 | 2 (DBS) | 12 | MSNBC |
| 8 | 2 (DBS) | 8 | CNBC |
| 9 | 2 (DBS) | 9 | MTV |
| 10 | 1 (CABLE) | 42 | HBO |

APPARATUS AND METHOD FOR INTEGRATING A PLURALITY OF VIDEO SOURCES

CROSS REFERENCE TO RELATED APPLICATIONS

This application claims priority under 35 U.S.C. §119(e) of U.S. Provisional Patent Application Serial No. 60/026,409, filed on Sep. 20, 1996 by Scott A. Stinebruner and entitled "Apparatus and Method for Integrating a Plurality of Video Sources", which provisional application is incorporated by reference herein.

FIELD OF THE INVENTION

The present invention generally relates to an apparatus and method for integrating a plurality of video sources for display on a video display. More particularly, the invention relates to an apparatus and method implementing centralized control of such video sources to facilitate the selection of individual video signals therefrom.

BACKGROUND OF THE INVENTION

The television and video industries continue to deluge the ordinary consumer with countless video entertainment options from an ever-increasing array of providers. At present, many consumers have access to several video sources, including over-the-air television, cable, and satellite, not to mention VCR's, laser discs, DVD discs, etc. Often, all of these sources are connected to a single television or video monitor, and are selectable by a viewer, often by using one or more remote controls.

With such a wide assortment of viewing options, it becomes quite unwieldy to find and select specific programs, particularly when the programs are obtained from different video sources. Often, a series of keys must be pressed on one or more remotes to (1) select the desired video source, and (2) tune the video source to a desired channel. When an external video source is connected to a television through an RF connector and re-broadcast at a specific frequency (e.g., channel 3 or 4), the video source is selected by tuning the television to the proper channel. Universal remotes which control multiple devices have been developed to integrate control into a single device. In addition, an IR or RF transmitter may be coupled to an electronic component to enable the component to output a control signal to another device such as a cable box. However, selection of channels on different sources is still problematic because a series of keys must still be pressed to select and tune the correct video source. Often, additional keys on the remote must also be pressed so that the remote sends the signals to the appropriate devices.

Another difficulty resulting from the proliferation of video programming is that specific programs or channels are difficult to find. Particularly with cable television, different cable companies may put different programs on different channels, and may even rearrange channels from time to time, making it difficult to find a specific program.

One other specific problem occurs with direct broadcast satellite (DBS) systems due to blackout restrictions on broadcast television networks such as ABC, CBS and NBC. In particular, DBS providers are prohibited from broadcasting networks in areas served by local affiliates due to exclusivity arrangements between the networks and the affiliates. A satellite owner, wishing to view local television stations, is required to use a separate antennae or to subscribe to cable service, and must often use an A-B switch to select between local (over-the-air or cable) and satellite signals.

A similar problem is provided by cable descramblers, since premium services and pay-per-view programs can only be viewed using a separate cable box. A user may want to view programs primarily through the television tuner, however, since enhanced features such as channel block, etc. may be available through the television and not through the cable box. Thus, to view premium services, a user may be required to switch over to the cable box and tune the box to the appropriate channel.

Many viewers like to "channel surf", whereby "up" and "down" buttons are used to switch between channels in sequence to find a desired program. However, to select channels found on different video sources, a user often has to specifically select a new video source and tune the video source to the proper channel.

It would be extremely desirable for many users to be able to quickly and effortlessly view programs from different video sources without having to specifically select and tune a video source. Therefore, a significant need has continued to exist for an improved manner of integrating multiple video sources into a video system.

SUMMARY OF THE INVENTION

The present invention addresses these and other problems associated with the prior art in providing a video system that utilizes a "virtual tuner" that integrates signals from multiple video sources to provide a plurality of "virtual channels", each of which has both a video source and a channel associated with it. When a virtual channel is selected, the correct video source is selected and tuned to the correct channel automatically. By selecting a virtual channel, the user is not required to specifically select, or even be aware of, which video source the channel originates. In addition, selection of a virtual channel may be performed with a single key depression, thereby greatly facilitating use of the multiple video sources.

In one preferred embodiment, the present invention may be embodied in a television or in a separate electronic component coupled thereto. In another preferred embodiment, however, the present invention may be embodied in a universal remote control which is capable of outputting multiple signals to multiple devices in response to a key depression. Implementing the invention in a single remote control in this manner would enable existing entertainment systems to obtain the benefits of the invention for a relatively modest expense.

Therefore, in accordance with one aspect of the invention, there is provided a video system, including first and second tuners, each tuner coupled to a video source and being tunable to one of a plurality of channels from the video source in response to a tuning signal, and each tuner outputting a video signal; a source selector receiving the video signals from the first and second tuners and outputting one of the video signals in response to a select signal; a memory storing an array of virtual channels, each virtual channel having a channel indicator related to a desired channel and a source indicator related to a desired tuner; and a controller, coupled to the tuners, the source selector and the memory, the controller selecting one of the plurality of virtual channels by outputting a select signal, related to the source indicator of the selected virtual channel, to the source selector, and outputting a tuning signal, related to the channel indicator of the selected virtual channel, to the selected tuner.

In accordance with another aspect of the invention, there is provided a direct broadcast satellite receiver, which includes a first tuner tuned to one of a plurality of channels in a direct broadcast satellite band and outputting a first video signal; a second tuner tuned to one of a plurality of channels in at least one of the VHF, UHF and CATV bands and outputting a second video signal; a source selector selectively outputting one of the first and second video signals as an output video signal; a memory storing an array of virtual channels, each virtual channel having associated therewith a source indicator specifying one of the tuners and a channel indicator specifying one of the channels on the specified tuner; and a controller, coupled to the tuners, the source selector and the memory, the controller selecting a virtual channel in response to a user input by (1) outputting a select signal to the source selector to select the specified tuner for the selected virtual channel; and (2) outputting a tuning signal to the specified tuner for the selected virtual channel to select the specified channel for the selected virtual channel.

According to an additional aspect of the invention, a video component is provided for receiving a cable television signal having a plurality of channels, at least one of which is scrambled, the cable television signal further received by a cable descrambler which descrambles scrambled channels. The video component includes a first external input receiving the cable television signal; a tuner coupled to the first external input and being tunable to output one of the plurality of channels from the cable television signal as a first video signal; a second external input receiving a second video signal from the cable descrambler; a transmitter for outputting a tuning signal to the cable descrambler to tune the cable descramber to output one of the plurality of channels; a source selector receiving the first and second video signals and outputting one of the video signals in response to a select signal; and a controller, coupled to the tuner, the transmitter, and the source selector, the controller, in response to a user selection of a scrambled channel, automatically selecting the second video signal and tuning the cable descrambler to output a corresponding descrambled channel in substitution therefor.

In accordance with a further aspect of the invention, there is provided a remote control for controlling a plurality of video sources coupled to a video display through a source selector. The remote control includes a keypad including at least one operator actuated key; a transmitter emitting actuating signals to control the plurality of video sources and the source selector; and a controller, coupled to the keypad and the transmitter, the controller generating, in response to actuation of the key a first signal output by the transmitter to the source selector to receive a video signal from a selected video source in the plurality of video sources for display on the video display; and a second signal output by the transmitter to the selected video source to select one of a plurality of channels to be output as the video signal by the selected video source.

According to an additional aspect of the invention, a method of integrating a plurality of video sources for display on a video display is provided. The method includes the steps of generating an array of virtual channels, each virtual channel including a source indicator related to a desired video source and a channel indicator related to a desired channel for the desired video source; and in response to an operator input, selecting one of the plurality of virtual channels by selecting the video source related to the source indicator for the selected virtual channel for output on the video display, and by tuning to the channel on the selected video source related to the channel indicator for the selected virtual channel.

In accordance with another aspect of the invention, a method is provided for integrating local over-the-air broadcast channels for display by a direct broadcast satellite receiver of the type having a plurality of channels. The method includes the steps of obtaining a location identifier related to a geographic area in which the direct broadcast satellite receiver operates; retrieving local channel information based on the location identifier; and assigning local channels to selected channels in the direct broadcast satellite receiver in response to the local channel information.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described preferred embodiments of the invention.

DETAILED DESCRIPTION OF THE PREFERRED EMBODIMENTS

Figure 1:
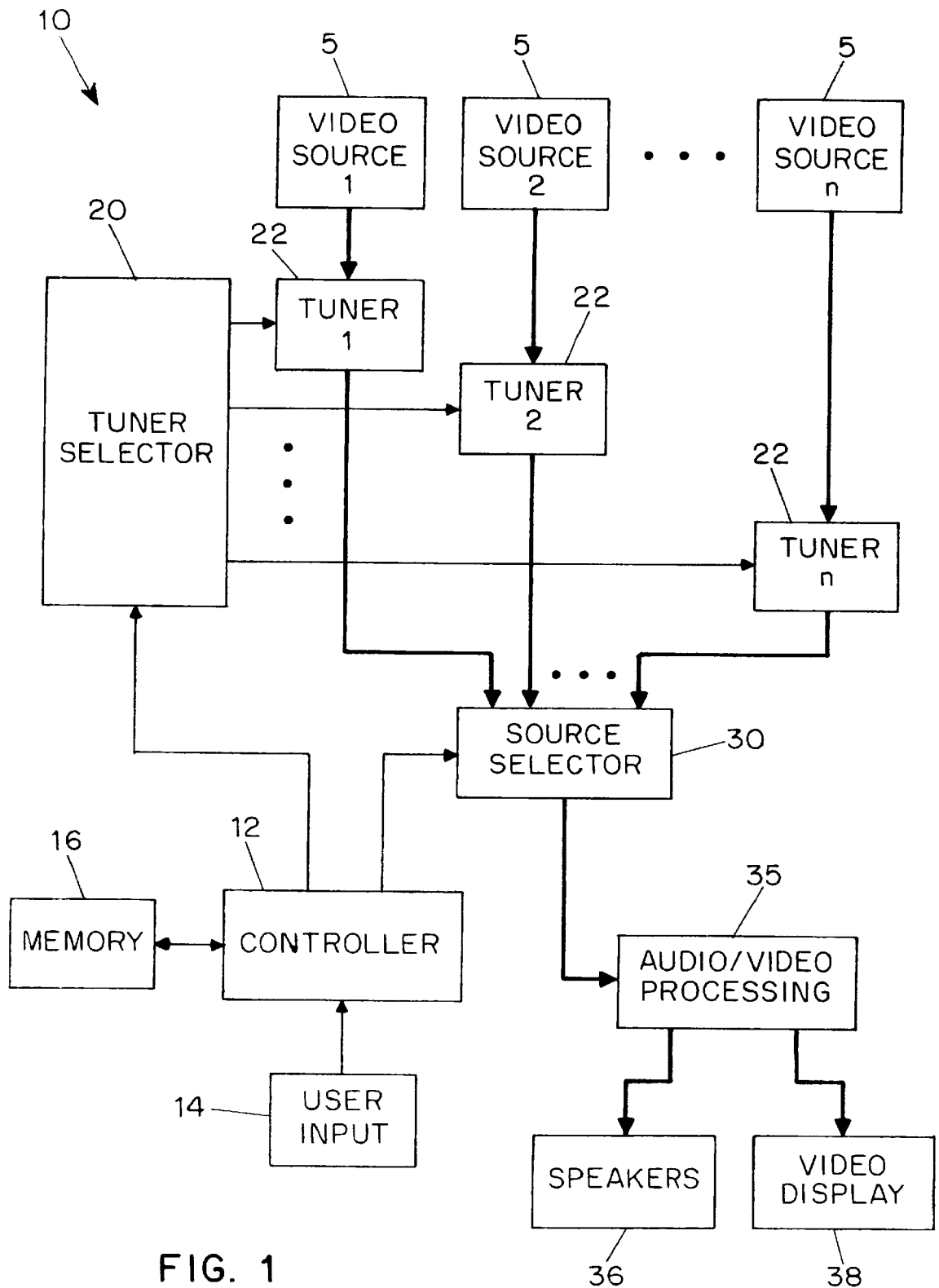
FIG. 1 is a functional block diagram of a preferred video system consistent with the principles of the present invention.

Turning to the Drawing, wherein like numbers denote like parts throughout the several views, FIG. 1 illustrates a preferred video system 10 consistent with the principles of the present invention. Video system 10 generally includes a controller 12, controlled via user input block 14, and coupled to a memory 16, a tuner selector 20 and a source selector 30. Video signals are provided by a plurality of video sources 5 (i.e., numbered 1 to n) which are tuned through a plurality of tuners 22 which are controlled via tuner selector 20 and source selector 30 to output a video signal comprising a selected channel from one of video sources 5. The output of source selector 30 is provided to audio/video processing block 35 which respectively outputs separate audio and video components to speakers 36 and video display 38.

Video sources 5 may include various video broadcast mediums such as over-the-air television broadcasts (e.g., VHF, UHF, etc.), cable television (CATV), and satellite transmission systems such as Direct Broadcast Satellite (DBS), among others. Multiple video signals are typically broadcast simultaneously as different frequency components of a broadcast transmission (as with cable and DBS), or as separate signals at allocated frequency bands (as with over-the-air). In the alternative, a video source may include only a single video signal (e.g., from a camcorder or VCR) which may or may not need to be demodulated with a tuner, or may have one or more signals modulated at different carrier frequencies in an internal or proprietary broadcast medium. Other video sources may also be used in the alternative.

It should be appreciated that, for example, over-the-air broadcasts all represent a single source, even though different tuners may be required to receive channels in different broadcasting frequency bands. For example, separate tuners may be provided for VHF and UHF signals, as well as for tuning HDTV, NTSC or PAL compatible signals, but all represent a single video source. Similarly, cable and satellite transmission systems also each represent single video sources, irrespective of whether separate tuners may be required to receive all available channels from the sources.

As a specific example, it is proposed for broadcasters to transmit their programming in both HDTV and non-HDTV formats so that owners of HDTV receivers can obtain the benefits of improved picture quality, while owners of non-HDTV receivers can still receive the programming without upgrading their receivers. Separate HDTV and non-HDTV tuners may be required in an HDTV receiver, with the HDTV tuner automatically selected whenever a program is broadcast in HDTV format. However, since both the HDTV and non-HDTV signals are over-the-air (or provided at different carrier frequencies in a CATV broadcast system), and since each transmits essentially the same programming for a given broadcast, the HDTV and non-HDTV signals should not be considered as emanating from separate video sources.

Video system 10 preferably operates by implementing a "virtual tuner" to select among a plurality of "virtual channels" and thereby integrate various channels from various video sources and facilitate selection of video signals from the various sources. Each virtual channel has associated with it at least a source indicator and a channel indicator which represent the source to view and the particular channel to view on that source. Additional information, e.g., a channel identifier (which could represent a textual description of the channel), a parental lock flag, among others, may also be associated with a virtual channel.

Virtual channel information is preferably stored in memory 16 coupled to controller 12. The controller, in turn, receives input from a user input block 14, which may be a remote control receiver, or keys or buttons accessible by a user, for example. Controller 12, in addition to overseeing other functions such as processing user input and other routine system functions, implements the virtual tuner through controlling tuner selector 20 and source selector 30.

Tuner selector 20 preferably outputs a control signal to the one of tuners 22 that corresponds to the source indicator for a given virtual channel to tune the appropriate tuner to the channel corresponding to the channel indicator for the virtual channel. Tuner selector 20 may also include a multiplexer to route the control signal to the appropriate tuner 22. Tuner selector 20 may also include separate latches or other storage mediums for maintaining each tuner 22 at a given channel. For example, tuner selector 20 may be implemented as a multiplexer coupled to the gate inputs of a plurality of latches coupled to the channel selector inputs of tuners 22. A separate channel bus may be coupled between controller 12 and tuners 22 to provide the desired tuning control signal. A tuner 22 would be controlled by placing the appropriate tuning control signal on the bus and routing a suitable latch control signal through the multiplexer to cause the latch for the selected tuner to capture the tuning control signal from the bus.

Tuner selector 20 may also be implemented in alternative manners. For example, tuner selector 20 may be implemented at least partially in controller 12 with separate signal paths to each tuner. Moreover, as will be discussed, tuners 22 may be implemented in separate electronic components, controlled, for example, through IR or RF transmissions. Other suitable designs should be apparent to one skilled in the art.

As discussed above, tuners 22 typically receive as an input signal multiple video signals at different frequency bands. Tuners 22 typically output a single video signal that is amplified and filtered from the input signal. The output signal of a tuner may be fully demodulated, or may be modulated at an intermediate frequency (IF) from which audio, color and synchronization information must still be obtained. It is important to note that in the preferred embodiment, video signals from different channels are not modulated or "re-broadcast" on different carrier frequencies for receipt by another tuner (e.g., as with many VCR's which output video signals on VHF channel 3 or 4). Instead, the outputs of the tuners typically represent single demodulated video signals, only one of which is output from source selector 30.

Tuners 22 may vary, particularly depending upon the video sources to which they are connected. DBS, cable and over-the-air signals typically require different tuners, for example. Moreover, different analog, digital and hybrid tuners are known in the art and may be used in the preferred embodiments of the invention. The tuners may be controlled via analog and/or digital signals, and it should be appreciated that digital-to-analog converters may be required between tuner selector 20 and tuners 22 should the tuners require analog control signals.

Source selector 30 operates as a multiplexer to output one of the video signals from tuners 22 in response to a control signal from controller 12. It should be appreciated that any suitable alternate switching mechanism may also be used to select one of the video signals from tuners 22 for output from source selector 30. Additional processing, e.g., separating out audio, color and synchronization information, or image enhancement and filtering techniques, is preferably performed on the video signal output from source selector 30 before display on video display 38 and speakers 36.

It should be appreciated that the individual components in video system 10 correspond to similar components in conventional televisions and video systems. Consequently, it should be appreciated that any alternatives and improvements developed in conjunction with conventional video systems, televisions and other video components may be implemented in connection with the preferred embodiments as desired. Moreover, no additional disclosure regarding the implementation of these components is provided herein as the specific implementations would be readily apparent to one of ordinary skill in the art.

Figure 2:
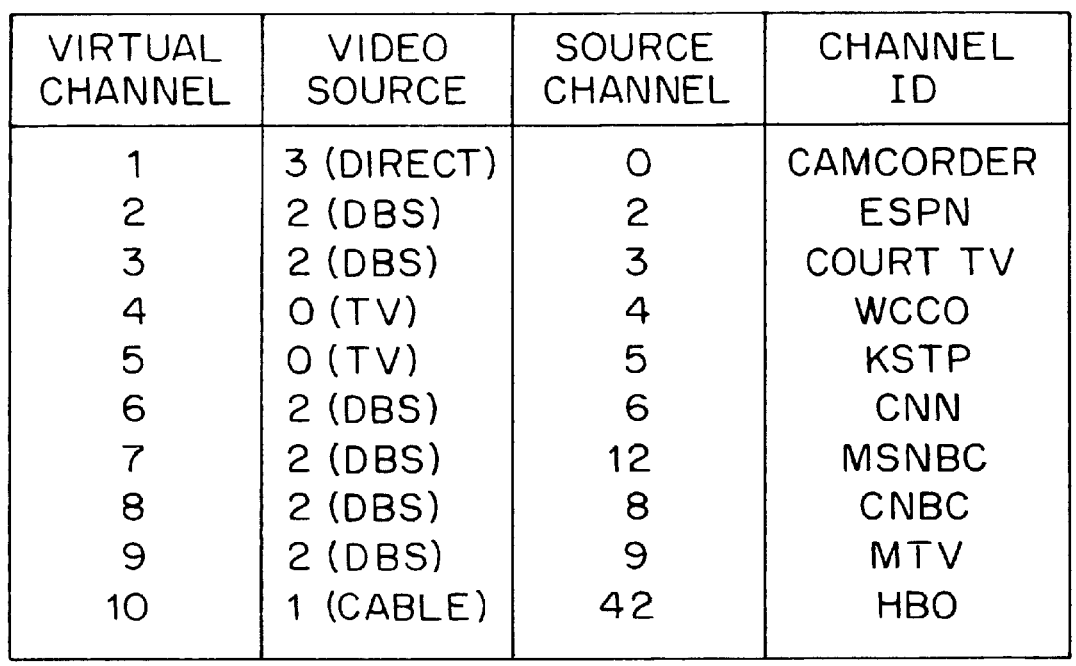
FIG. 2 is a table of exemplary data for a plurality of virtual channels stored in the memory of the video system of FIG. 1.

FIG. 2 illustrates a preferred arrangement of data for a series of virtual channels stored in memory 16. For example, each virtual channel may include at least a video source indicator (here 0–3, where 0=over-the-air television, 1=cable, 2=DBS, and 3=direct line) and a channel indicator (the range of which may be specific to each source). The channel indicator could represent a numerical channel number, a tuning frequency corresponding to the channel, or even an analog value corresponding to the same for controlling a voltage controlled oscillator (VCO), among other formats. Moreover, additional data (e.g., a channel ID to be displayed on the television and optionally usable for finding channels) may also be stored for each virtual channel.

The particular arrangement of virtual channels in FIG. 2 highlight several advantages and features available from the use of virtual channels. First, virtual channel I illustrates the ability to map a direct video source such as a camcorder into a tuning sequence. In this instance, no separate channel identifier may be required (e.g., using 0 as a null value), or alternatively, if the camcorder broadcasts at a preset VHF frequency (typically channel 3 or 4), that channel may be supplied.

Second, virtual channels 2–6 and 9–10 illustrate how channels from multiple sources may be integrated together. For example, virtual channels 4 and 5 may be assigned to local over-the-air channels and integrated into a series of DBS channels (e.g., channels 2–3 and 6) such that local channels may be easily accessed by a DBS user. A DBS content provider may even allocate blank channels to local programming so that individual users in different areas of the country could map local channels to the blank channels without having to move the overlapped channels to other virtual channels. Also, as illustrated by virtual channels 2–6, virtual channels may be mapped to the same actual channel. Alternatively, as illustrated by virtual channel 10, actual channels may be assigned to different virtual channels.

Third, virtual channels 7–8 illustrate how channels may be rearranged as a user desired. For example, DBS channels 12 and 8 have been mapped to virtual channels 7 and 8 to group together several news-related networks. This would, for example, permit users to rearrange channels into groups of related programming (e.g., news, sports, kids, movies, music, etc.).

In general, the use of the virtual channels permits a user to select the arrangement of channels from different sources irrespective of the ordered arrangement of channels on each of the sources. Consequently, a significant degree of programming flexibility is attained through use of the preferred embodiments of the invention.

Returning to FIG. 1, implementation of the virtual channels is preferably accomplished through channel selection routines executed in response to specific user input from block 14. As with many conventional video systems, channels are preferably selected via direct (or random) access (e.g., through a numerical keypad on a television, other electronic component, or remote control), or through channel up (+) and channel down (−) buttons (also on a television, other electronic component, or remote control) that select immediately succeeding and preceding channels. Other manners of selecting channels, e.g., selecting via an on-screen display, may also be used.

Figure 3:
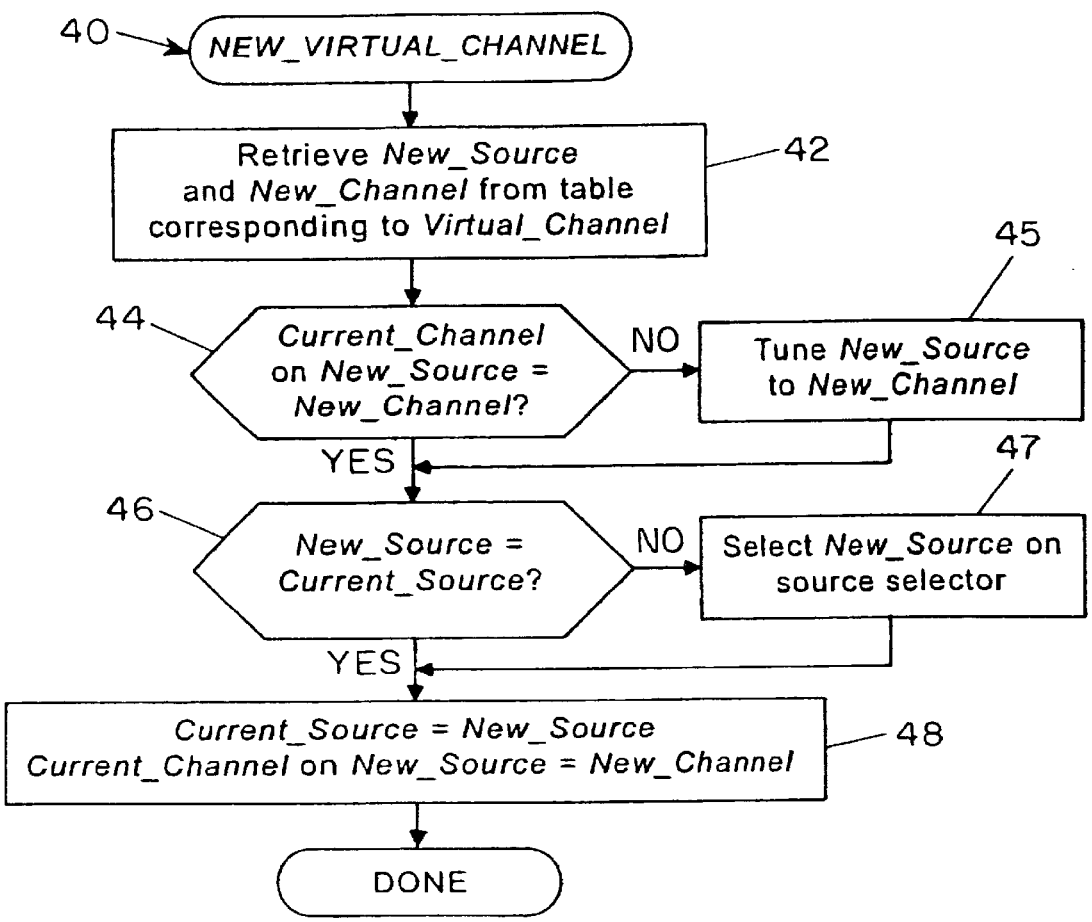
FIG. 3 is a flowchart illustrating the program flow of a preferred New__Virtual__Channel routine implemented in the video system of FIG. 1.
Figure 4:
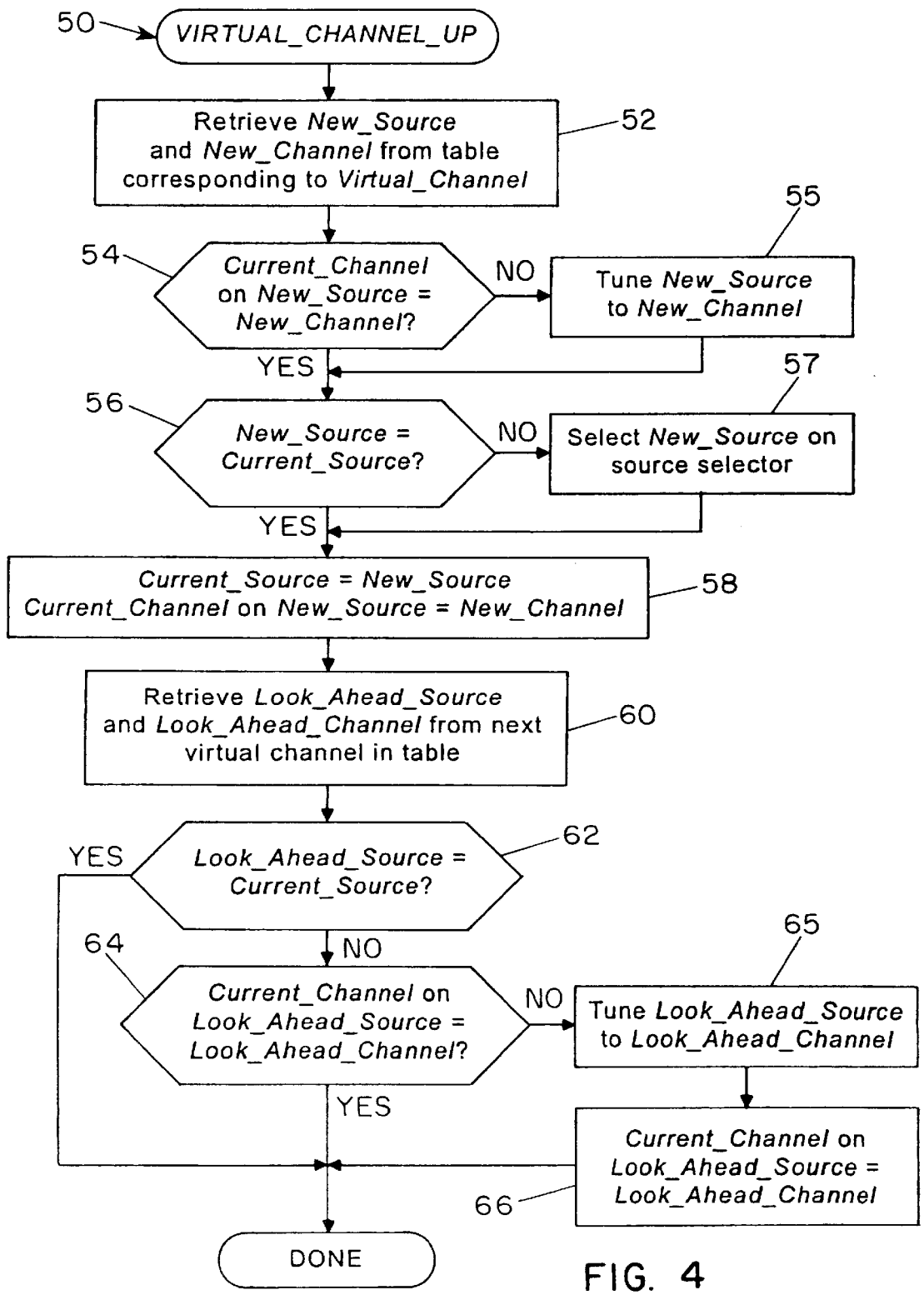
FIG. 4 is a flowchart illustrating the program flow of a preferred Virtual__Channel__Up routine implemented in the video system of FIG. 1.

FIGS. 3 and 4 illustrate two sample routines, executed on controller 12, for handling the virtual channels in video system 10. Other routines executed on controller 12 to perform other conventional tasks are not disclosed herein as they are not necessary for a full understanding of the present invention.

Virtual channels may be implemented on controller 12 by simply accessing memory 16 and sending appropriate signals to tuner selector 20 and source selector 30 to output the appropriate channel on the appropriate source. However, in the preferred embodiment, controller 12 eliminates unnecessary control signals and thereby speeds performance by maintaining a Current_Source variable indicating which video source is selected, as well as a separate Current_Channel variable for each video source.

FIG. 3 illustrates a New_Virtual_Channel routine 40 for providing direct access tuning of video system 10. A calling routine preferably passes as input to routine 40 a new virtual channel stored in a Virtual_Channel variable. Routine 40 begins in block 42 by retrieving the source and channel indicators (designated New_Source and New_Channel) for the selected virtual channel stored in memory 16.

Next, in block 44, Current_Channel on New_Source is compared to New_Channel. If they are equal, no modification to the tuner 22 corresponding to the New_Source is required, and control passes to block 46. If, however, they are not equal, block 45 is executed to tune New_Source to New_Channel before passing control to block 44.

Next, in block 46, New_Source is compared to Current_Source. If they are equal, no modification to source selector 30 is required, and control passes to block 48. If, however, they are not equal, block 47 is executed to select New_Source on source selector 30 before passing control to block 48.

Next, in block 48, the current channel and source are updated by setting Current_Source equal to New_Source, and setting Current_Channel for New_Source equal to New_Channel. Routine 40 is then complete.

Routine 40 may also be called in response to channel up and channel down button depressions, with the calling routine handling incrementing and decrementing the Virtual_Channel variable. On the other hand, it may be preferable to separately handle the channel up and channel down button depressions. In particular, separately handling these functions may permit "pre-tuning" of non-selected video sources to occur and thereby speed the transitions between virtual channels.

For example, FIG. 4 illustrates a Virtual_Channel_Up routine 50 for selecting the next virtual channel. A calling routine preferably passes as input to routine 50 a new Virtual_Channel variable. The calling routine also handles incrementing the Virtual_Channel variable, as well as wrapping the variable around when the maximum channel is selected. In the alternative, maintaining the Virtual_Channel variable may be handled by routine 50 if desired.

Blocks 52, 54, 55, 56, 57 and 58 generally operate in the same manner as blocks 42, 44, 45, 46, 47 and 48 of routine 40, whereby the New_Source and New_Channel corresponding to the selected Virtual_Channel are selected for viewing. Blocks 60–66 are also executed in this routine, however, to attempt to pre-tune non-selected sources to anticipate future key depressions by a user. In particular, it is assumed that, when a channel up button has been depressed, the most likely next occurrence is that the channel up button will again be depressed. Thus, blocks 60–66 attempt to, when possible, tune the source corresponding to the next virtual channel to the channel corresponding to the immediately following virtual channel, such that when the channel up button is again depressed, only the source need be selected.

Block 60 first accesses the virtual channel table in memory 16 to obtain Look_Ahead_Source and Look_Ahead_Channel variables corresponding to the next virtual channel adjacent the current virtual channel (this block may also include wrap-around detection to look at the first virtual channel when the last virtual channel is currently selected). Next, in block 62, Look_Ahead_Source is compared to Current_Source. If they are equal, then no pre-tuning may be performed, so routine 50 is completed. If, however, they are not equal, control next passes to block 64 to determine if the Current_Channel on Look_Ahead-Source is equal to Look_Ahead_Channel. If they are, the tuner corresponding to Look_Ahead_Source is already tuned to the proper channel. If not, blocks 65 and 66 are executed to (1) tune Look_Ahead_Source to Look_Ahead_Channel, and (2) update Current_Channel on Look_Ahead_Source to Look_Ahead_Channel. Routine 50 is then complete.

A routine for handling a channel down button depression operates in the same manner as routine 50, except that the Look_Ahead_Source and Look_Ahead_Channel are obtained from the immediately preceding virtual channel, as it is assumed that the most likely next occurrence is another depression of the channel down button. Other look-ahead functions may also be incorporated into the above-routines. For example, routine 50 may be modified to also look at the immediately preceding virtual channel to anticipate a user going back to a just-viewed virtual channel. A look-ahead function may also search forward or backward through the virtual channels to pre-tune the closest non-selected source in a given direction. In addition, the look-ahead functions may be incorporated into direct access routine 40 if desired. Other modifications should be apparent to one skilled in the art.

Video system 10 may be implemented in a number of electronic components and systems consistent with the invention. For example, FIGS. 5–7 illustrate three preferred implementations of video system 10.

Figure 5:
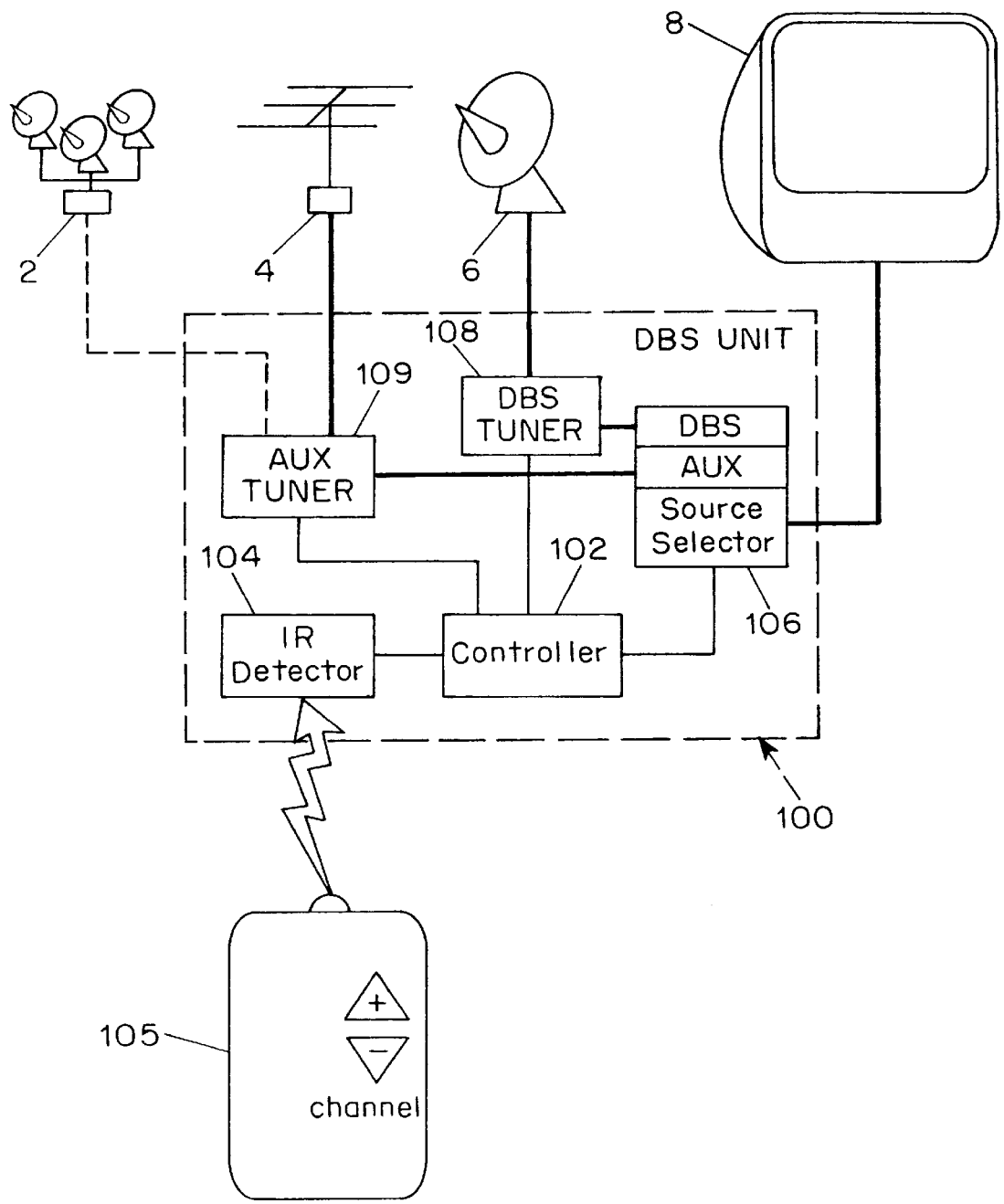
FIG. 5 is a block diagram of one preferred implementation of the video system of FIG. 1, implemented in a Direct Broadcast Satellite (DBS) receiver.

FIG. 5 illustrates video system 10 implemented in a Direct Broadcast Satellite (DBS) receiver 100. Conventional DBS receivers are available, for example, from RCA and Sony, among others. DBS receiver 100 includes a controller 102 (memory not shown) coupled to a DBS tuner 108, an auxiliary tuner 109 and a source selector 106. An IR detector 104 (or optionally, an RF detector or other manner of receiving remote control signals) receives control signals from remote 105 to provides them as user input to controller 102. DBS tuner 108 is coupled to a satellite dish 6 for receiving and decoding a satellite video signal. Auxiliary tuner 109 is preferably a CATV and/or VHF/UHF tuner coupled to an antenna 4 for receiving VHF/UHF over-the-air video signals, or optionally, a cable television signal designated at 2. Source selector 106 operates as an A-B switch for outputting a video signal from one of tuners 108 and 109 and providing the video signal to an external television or monitor 8. Other components, e.g., user input buttons, signal processing components, etc. are not shown separately in FIG. 5 as they are not necessary for a full understanding of the invention.

With the preferred hardware configuration of DBS receiver 100, it is possible to implement the preferred virtual tuner to integrate local broadcast and/or cable television channels into the channel lineup of DBS programming, in the manner discussed above. In this configuration, controller 102 operates as the tuner selector by providing direct control over each tuner 108, 109. Moreover, controller 102 (specifically, its memory) stores the table of virtual channels and associated data therefor.

Figure 6:
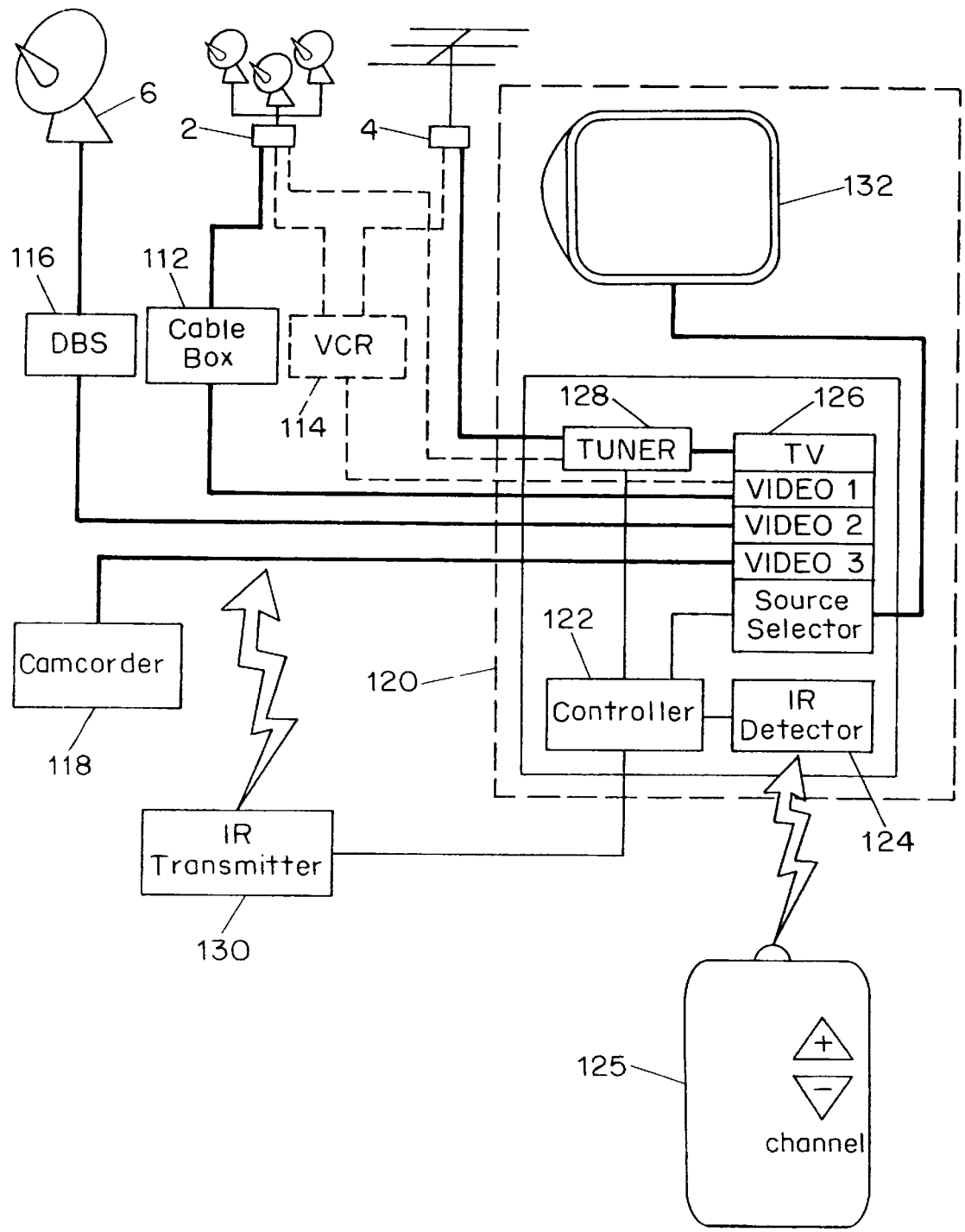
FIG. 6 is a block diagram of another preferred implementation of the video system of FIG. 1, implemented in a television.
Figure 7:
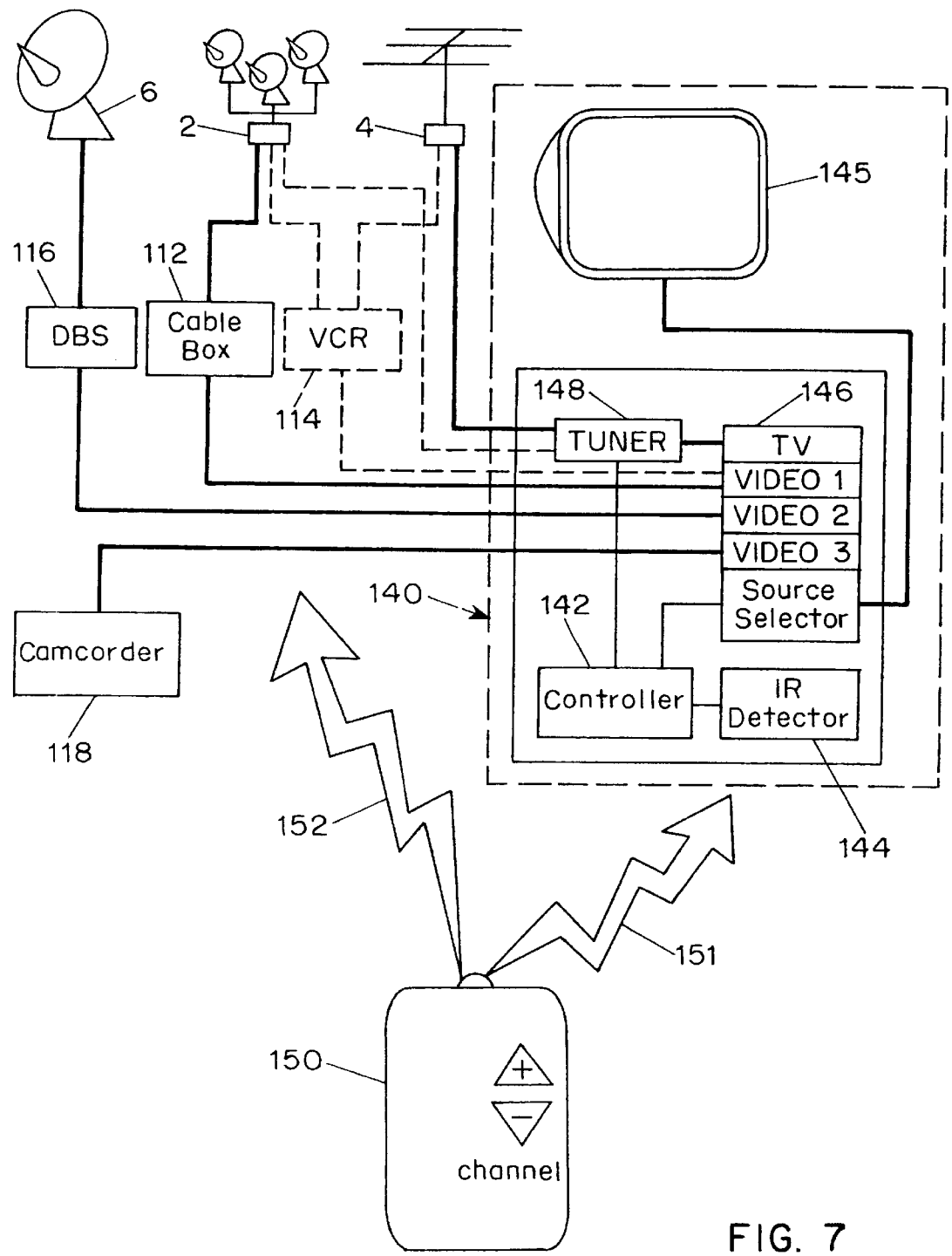
FIG. 7 is a block diagram of yet another preferred implementation of the video system of FIG. 1, implemented in a universal remote control.

FIG. 6 illustrates video system 10 implemented in a video component such as television 120. Television 120 generally includes a controller 122 which receives user input from a remote control 125 through an IR (or RF) detector 124. Controller 122 is coupled to a VHF/UHF/CATV tuner 128 and a four-way source selector 126. Source selector 126 receives video signals from internal tuner 128, as well as three external inputs (designated VIDEO 1, VIDEO 2 and VIDEO 3), and outputs a video signal selected from one of the inputs to monitor 132. Other circuitry, e.g., synchronization and audio processing circuitry, is not shown separately in FIG. 6.

Television 120 also includes an external IR (or optionally, an RF) transmitter 130 used to supply control signals to external components such as DBS receiver 116, cable box 112 and VCR 114. Alternatively, a wired connection could be made, e.g., in a proprietary networked system.

As shown in FIG. 6, a number of video sources may be coupled to television 120. For example, an antenna 4 or cable television signal 2 may be coupled to tuner 128. Additional external video components, e.g., DBS receiver 116 (coupled to satellite dish 6), cable descrambler (or cable box) 112, or VCR 114 may be coupled to the external inputs of television 120. In addition, a direct video signal may be supplied, e.g., from a camcorder 118. In the configuration shown in FIG. 6, a tuner selector is implemented by controller 122 in combination with IR transmitter 130 to transmit appropriate control signals to tune tuner 128 as well as the tuners in the external devices 112, 114 and 116. Virtual channels are stored in a memory (not shown) coupled to controller 122, and implemented in a manner discussed above.

FIG. 7 illustrates video system 10 implemented in a universal remote control 150. In this implementation, remote control 150 generates two signals, a first or source select signal 151, and a second or channel select signal 152. Therefore, both the source selector and the tuner selector are implemented in remote control 150 via the generation of signals 151 and 152.

As shown in FIG. 7, remote control 150 may control a television 140 (having controller 142, IR detector 144, source selector 146, tuner 148 and monitor 145. Remote control 150 may also control several external devices coupled to external inputs on television 140, including cable box 112, VCR 114, and DBS receiver 116. In addition, similar to television 120 of FIG. 6, any of a number of video sources, e.g., satellite dish 6, cable television signal 2, antenna 4 and camcorder 118 may be coupled for display on television 140.

Figure 8:
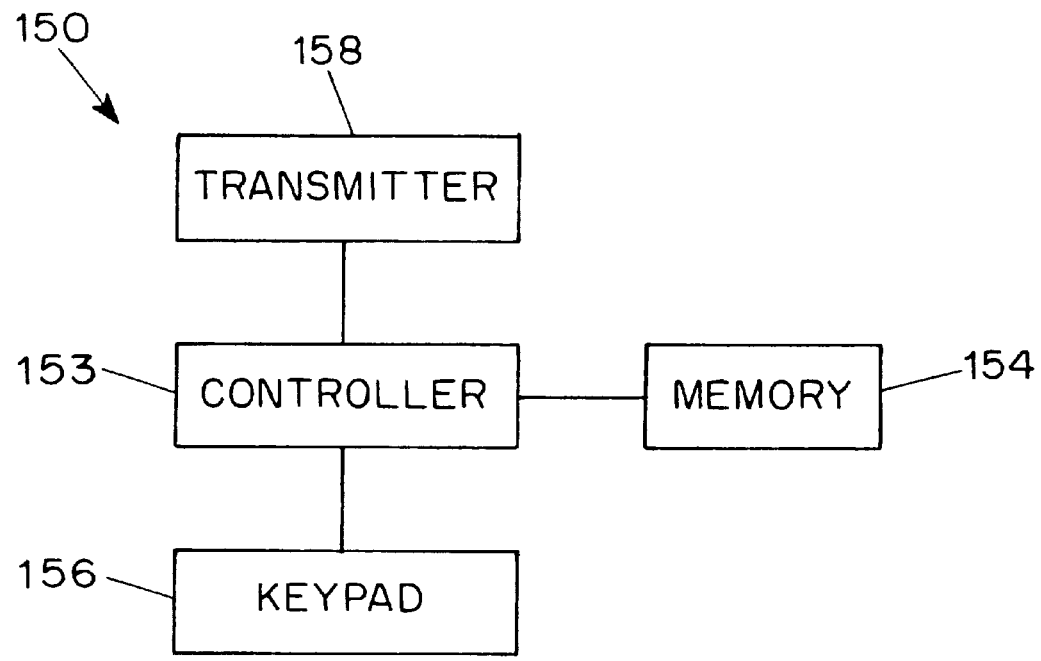
FIG. 8 is a block diagram of a single transmitter implementation of the universal remote control of FIG. 7.

FIG. 8 illustrates remote control 150 in greater detail. In this embodiment, remote control 150 includes a controller 153, memory 154, keypad 156 and remote control (typically IR or RF) transmitter 158. The hardware components implementing these blocks may be similar or identical to any of several universal remote controls available from a variety of commercial sources, with the program code implemented by the controllers of these remote controls modified to implement routines similar to routines 40 and 50 shown in FIGS. 3 and 4. The specific codes and communication protocols required to transmit appropriate control signals will vary depending upon the particular devices controlled by remote control 150. The particular codes may be stored in non-volatile memory of remote control 150, or may be "learned" by the control, similar to many universal remote controls on the market.

In many embodiments, it may not be possible for remote control 150 to monitor the current channel settings for each video source, particularly where it is possible via buttons on the video sources themselves to change the channels. Consequently, sending channel up and channel down commands may not be possible, thereby requiring direct access commands to be sent to the appropriate devices when selecting a given channel.

Figure 9:
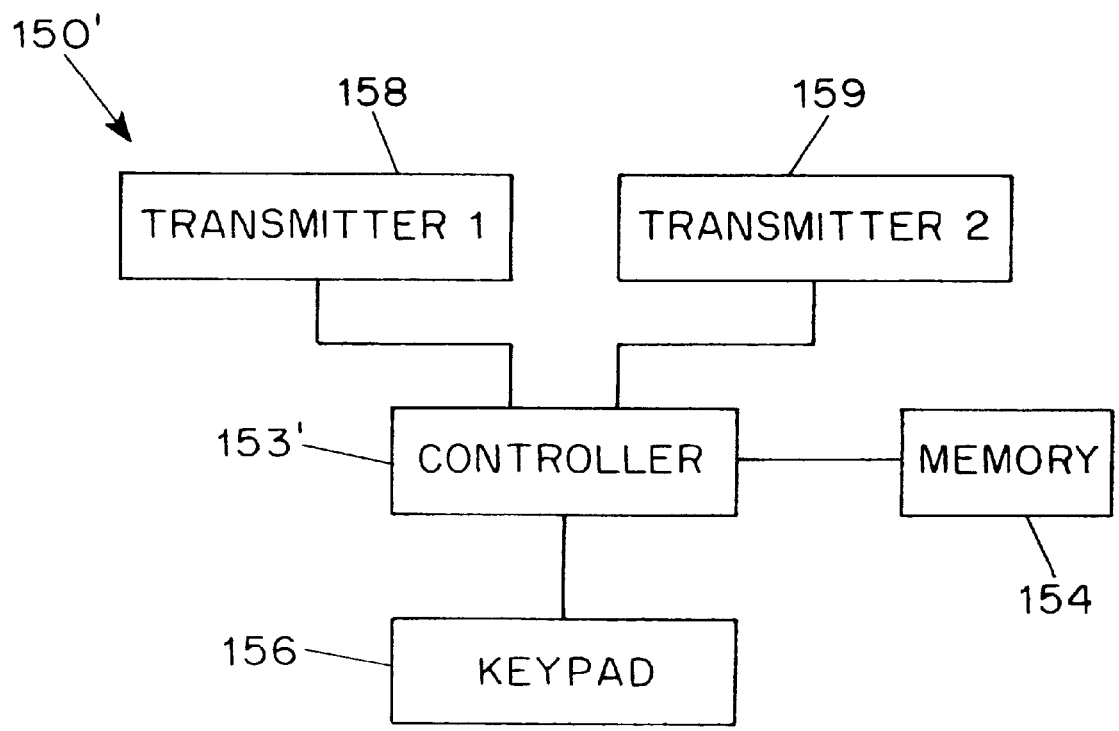
FIG. 9 is a block diagram of a two transmitter implementation of the universal remote control of FIG. 7.

FIG. 9 illustrates an alternate remote control 150' which, in addition to a controller 153', memory 154, keypad 156 and remote control (IR or RF) transmitter 158, includes a second remote control (IR or RF) transmitter 159. With this configuration, the transmission of first and second signals 151 and 152 may occur simultaneously via the separate transmitters. This has the benefit of reducing the time required to select the source and channel. It is possible that some interference could occur, e.g., if the two electronic components receiving the signals required IR transmissions at the same carrier frequency. Therefore, this embodiment may be more useful where transmitter 158 is an IR transmitter and transmitter 159 is an RF transmitter (or vice versa).

Virtual channels may be programmed into a video system in a number of manners. For example, virtual channels may be programmed similar to channel programming of televisions and other electronic devices, e.g., using a series of on-screen menus. In addition, automatic programming routines may be implemented to automatically detect viewable channels within an available bandwidth. For example, in the situation of a DBS system in which it is desired to incorporate local channels, it may be desirable to first auto-program the virtual channels with the available DBS channels, then manually incorporate the local channels at desired virtual channels. Once the virtual channels are programmed into video system 10, channel selection by a user is a straightforward process similar to conventional channel selectors for a single source.

Virtual channels may also be downloaded to a video system from an external source or retrieved from an on-board memory in the system. For example, a user may input a location identifier to indicate to a video system the location in which the system is installed. Based upon this information, the video system may then obtain local channel information and utilize the information to integrate local channels into a channel sequence of satellite channels.

The location identifier may be any information suitable to identify the local broadcast channels available for a given location. For example, suitable location identifiers may include ZIP codes, telephone area codes and exchanges, and street addresses, among others.

The local channels may be automatically incorporated at corresponding virtual channels (e.g., local channel 3 located at virtual channel 3), whereby existing channels on other sources would be moved to other virtual channels. In the alternative, a block of unused virtual channels may be reserved for local programming, with the local channels added upon download.

The local channel information may be obtained in a number of manners, such as by accessing an on-board database, or by downloading from an external source. The information from an external source may be encoded within a video stream over a cable line or satellite signal, provided in a separate signal such as an over-the-air broadcast signal, or provided by a server computer over a network or telephone line. Many DBS systems, for example, already are capable of communicating with another computer system over a telephone line and performing software upgrades via information encoded in a satellite signal. Consequently, little or no additional hardware modifications would be required to provide this local channel download capability in these DBS systems.

Figure 10:
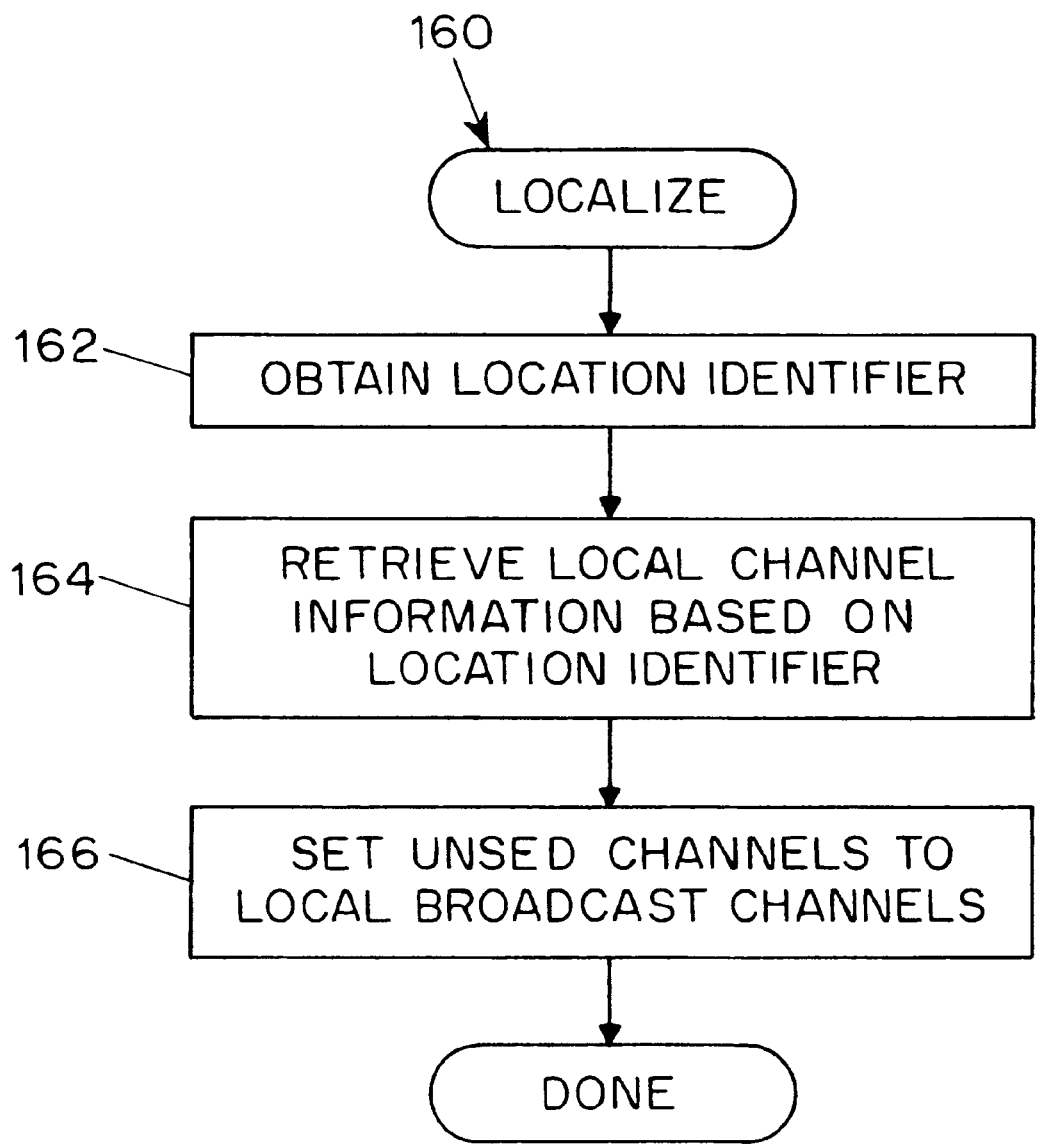
FIG. 10 is a flowchart illustrating the program flow of a preferred Localize routine implemented in the DBS receiver of FIG. 5.

FIG. 10 illustrates a preferred Localize routine 160 that is preferably executed in a DBS receiver such as DBS receiver 100 of FIG. 5. Generally, routine 160 would be executed, for example, in response to a user inputting a "localize" command from an on-screen menu or other suitable input to the receiver. In block 162, a location identifier is obtained from a user, e.g., through direct input of telephone number, area code, ZIP code, or address. In the alternative, a caller ID function implemented by a server computer may also be used to obtain this information. Next, in block 164, local channel information is retrieved, either from an on-board database stored in non-volatile memory, over a telephone connection, or from embedded information in a satellite signal. Next, in block 166, this information is used to program a block of unused virtual channels with the local over-the-air channel information. The number of virtual channels allocated to this function may vary, since different markets have a different number of network affiliates as well as independent and public broadcast stations. Also, as discussed above, the local channels may be mapped to other virtual channels, thereby possibly requiring some satellite channels to be mapped to other virtual channels to accommodate the local programming.

In general, it should be appreciated that one principal benefit of the invention is in the ability to "map" channels from one video source over channels on another video source. For example, it may be desirable to utilize the tuning functions of a television to display video signals from a plurality of sources without losing the particular tuning functions (e.g., parental lock, etc.) provided by the television, but which are otherwise lost when an external video source must be controlled separately to display particular channels.

Also, it may be possible to map premium cable channels from an external cable box into the existing cable channel lineup available through a television's tuning functions. The premium channels may even be automatically mapped over the scrambled versions thereof such that the unscrambled versions of the premium channels are displayed instead of the scrambled versions, thereby permitting any enhanced tuning functions of a television to be retained even if they are not supported directly by the cable box.

Another principal benefit is that channels from different sources may be arbitrarily assigned to virtual channels without respect to the actual arrangement of channels in a frequency range on a given source (i.e., VHF channel 2 need not be immediately before VHF channel 3). The virtual tuner essentially may create a layer of abstraction which disassociates the process of selecting a program from the underlying video source and channel for the program. Once programmed, the user no longer is required to know or care from which video source or electronic component a program emanates, or from where on that video source or component the program is located. In many conventional tuning arrangements, channels are associated with predefined carrier frequencies that cannot be changed. With the present invention, however, the virtual channels are freed from such associations, and thus may be arranged non-sequentially with respect to any particular video source.

Moreover, with respect to the automatic incorporation of local channels into a video system as discussed above with reference to FIG. 10, one principal benefit is that individual video systems may be automatically configured with local programming, and consequently, the broadcast networks carried thereby, without violating exclusivity arrangements with local affiliates. As discussed above, broadcast networks such as ABC, CBS and NBC cannot be incorporated into DBS systems in areas served by local affiliates. However, by incorporating the local broadcast signals into selected virtual channels, the broadcast networks are de facto incorporated into the DBS system where they were heretofore prevented in many instances. Moreover, due to the automatic nature in which localizing of a DBS receiver may occur, a DBS manufacturer may produce a single design for distribution throughout a large area such as the United States, then enable the receiver to automatically configure itself after installation at a particular location.

Various modifications may be made to the preferred embodiments without departing from the spirit and scope of the invention. For example, as discussed above, textual channel identification may be stored for each virtual channel, thereby permitting display of the textual information and access of virtual channels by inputting or searching the textual information. Other modifications will be apparent to one skilled in the art.

What is claimed is:

1. A video system, comprising:
   (a) first and second tuners, each tuner coupled to a video source and being tunable to one of a plurality of channels from the video source in response to a tuning signal, and each tuner outputting a video signal;
   (b) a source selector receiving the video signals from the first and second tuners and outputting one of the video signals in response to a select signal;
   (c) a memory storing an array of virtual channels, each virtual channel having a channel indicator related to a desired channel and a source indicator related to a desired tuner; and
   (d) a controller, coupled to the tuners, the source selector and the memory, the controller selecting one of the plurality of virtual channels by outputting a select signal, related to the source indicator of the selected virtual channel, to the source selector, and outputting a tuning signal, related to the channel indicator of the selected virtual channel, to the selected tuner.

2. The video system of claim 1, wherein the video sources are selected from the group consisting of cable television signals, over-the-air broadcast signals and satellite signals.

3. The video system of claim 1, wherein the source selector further receives a third video signal from a direct video source.

4. The video system of claim 1, wherein each virtual channel includes a channel identifier.

5. The video system of claim 1, further comprising a direct broadcast satellite receiver housing the first and second tuners, the source selector, the memory and the controller, wherein the first tuner is a satellite tuner and the second tuner is a VHF/UHF/CATV tuner.

6. The video system of claim 1, further comprising a television housing the first tuner, the source selector, the memory and the controller.

7. The video system of claim 6, wherein the television further includes:
   (a) an external input receiving the video signal from the second tuner; and
   (b) a remote control transmitter, coupled to the controller, for outputting a tuning signal to the second tuner.

8. The video system of claim 1, further comprising a remote control housing the memory and controller, the remote control further including a remote control transmitter for sequentially outputting the select and tuning signals to the source selector and the selected tuner.

9. The video system of claim 1, further comprising a remote control housing the memory and controller, the remote control further including first and second remote control transmitters for respectively outputting the select and tuning signals to the source selector and the selected tuner.

* * * * *